United States Patent
Moon et al.

(10) Patent No.: US 10,965,454 B2
(45) Date of Patent: Mar. 30, 2021

(54) APPARATUS AND METHOD FOR PUBLIC KEY ENCRYPTION

(71) Applicant: SAMSUNG SDS CO., LTD., Seoul (KR)

(72) Inventors: Duk-Jae Moon, Seoul (KR); Kyu-Young Choi, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 126 days.

(21) Appl. No.: 15/586,938

(22) Filed: May 4, 2017

(65) Prior Publication Data
US 2017/0346629 A1  Nov. 30, 2017

(30) Foreign Application Priority Data

May 27, 2016 (KR) .......................... 10-2016-0065891

(51) Int. Cl.
*H04L 29/06* (2006.01)
*H04L 9/08* (2006.01)
(Continued)

(52) U.S. Cl.
CPC ............ *H04L 9/0869* (2013.01); *H04L 9/002* (2013.01); *H04L 9/0618* (2013.01); *H04L 9/14* (2013.01);
(Continued)

(58) Field of Classification Search
CPC ......... H04L 9/0869; H04L 9/002; H04L 9/14; H04L 9/30; H04L 2209/16
See application file for complete search history.

(56) References Cited

U.S. PATENT DOCUMENTS 5,623,548 A * 4/1997 Akiyama ................ H04L 9/002
380/28
10,256,970 B2 * 4/2019 Gorissen ............... H04L 9/0618
(Continued)

FOREIGN PATENT DOCUMENTS

CN        101536398 A    9/2009
KR  10-2012-0089396 A    8/2012
(Continued)

OTHER PUBLICATIONS

Communication dated Jun. 14, 2018 by the Korean Intellectual Property Office in counterpart Korean Patent Application No. 10-2016-0065891.
(Continued)

*Primary Examiner* — Shewaye Gelagay
*Assistant Examiner* — Michael M Lee
(74) *Attorney, Agent, or Firm* — Sughrue Mion, PLLC

(57) ABSTRACT

Disclosed are an apparatus and method for public key encryption using a white-box cipher algorithm. An apparatus for public key encryption using a white-box cipher algorithm includes a key table generator configured to generate at least one key table from a cipher key, a hidden-key table generator configured to convert the at least one key table into at least one hidden-key table, and an encryption algorithm generator configured to generate a white-box implemented encryption algorithm by using the at least one hidden-key table and an inverse operation of the conversion and provide the generated encryption algorithm as a public key for encryption.

6 Claims, 16 Drawing Sheets

(51) Int. Cl.
*H04L 9/06* (2006.01)
*H04L 9/00* (2006.01)
*H04L 9/14* (2006.01)
*H04L 9/30* (2006.01)

(52) U.S. Cl.
CPC ............ *H04L 9/30* (2013.01); *H04L 2209/12* (2013.01); *H04L 2209/16* (2013.01); *H04L 2209/24* (2013.01)

(56) References Cited

U.S. PATENT DOCUMENTS

| | | | | |
|---|---|---|---|---|
| 2001/0008016 A1* | 7/2001 | Kotani | .................... | G06F 21/10 713/193 |
| 2006/0239455 A1* | 10/2006 | Kato | ........................ | H04L 9/00 380/201 |
| 2009/0158051 A1* | 6/2009 | Michiels | ................. | H04L 9/002 713/189 |
| 2011/0064215 A1* | 3/2011 | Michiels | ................. | G06F 7/723 380/28 |
| 2011/0083020 A1* | 4/2011 | Michiels | ................. | H04L 9/004 713/189 |
| 2011/0116625 A1* | 5/2011 | Michiels | ................. | G06F 21/14 380/28 |
| 2012/0093313 A1* | 4/2012 | Michiels | ................. | H04L 9/002 380/255 |
| 2012/0121083 A1 | 5/2012 | You et al. | | |
| 2012/0192283 A1* | 7/2012 | Gu | .......................... | G06F 21/14 726/26 |
| 2016/0239267 A1* | 8/2016 | Bos | ....................... | G06F 7/4812 |
| 2019/0103957 A1* | 4/2019 | Isobe | ....................... | G09C 1/00 |

FOREIGN PATENT DOCUMENTS

| | | |
|---|---|---|
| KR | 10-2015-0090438 A | 8/2015 |
| WO | 2009/136361 A1 | 11/2009 |
| WO | 2016/043665 A1 | 3/2016 |

OTHER PUBLICATIONS

Communication dated Nov. 12, 2019 issued by the State Intellectual Property Office of P.R. China in counterpart Chinese Application No. 201710339226.8.

Xiao Yaying, "White Box Ciphers and the Implementation of AES and SMS4 Algorithms", Implementation of White Box Cipher and AES and SMS4 Algorithm, Globe Thesis, cnki.net, Issue 10, 2010, 16 pages total.

* cited by examiner

APPARATUS AND METHOD FOR PUBLIC KEY ENCRYPTION

CROSS-REFERENCE TO RELATED APPLICATION

This application claims priority to and the benefit of Korean Patent Application No. 10-2016-0065891, filed on May 27, 2016, the disclosure of which is incorporated herein by reference in its entirety.

BACKGROUND

1. Field

Embodiments of the present disclosure relate to encryption and decryption technology.

2. Discussion of Related Art

There has been interest in a conventional public-key configuration principle that uses a symmetric-key-cipher-based white-box implementation. As an example, a public-key cipher configuration method in which a symmetric-key-based white-box implementation is used as a public key and a cipher key hidden in the implementation is used as a private key has been introduced.

However, in a case of the conventional white-box implementation, an attacker may acquire cipher key information, which is a private key, through additional information analysis or theoretical analysis about signals and electric power. That is, the conventional white-box implementation is vulnerable in that private-key-protection-associated safety that should be provided by a public-key cipher cannot be provided.

Also, while the conventional public-key-cipher-based white-box implementation method has been proposed, it is not actually utilized because of its low implementation efficiency.

SUMMARY

Embodiments of the present disclosure provide an apparatus and method for public key encryption using a white-box cipher algorithm.

According to an aspect of the present disclosure, there is provided an apparatus for public key encryption using a white-box cipher algorithm, the apparatus including a key table generator configured to generate at least one key table from a cipher key, a hidden-key table generator configured to generate at least one hidden-key table by performing conversion of the at least one key table, and an encryption algorithm generator configured to generate an white-box implemented encryption algorithm by using the at least one hidden-key table and an inverse operation of the conversion and provide the generated encryption algorithm as a public key for encryption.

The hidden-key table generator may generate the at least one hidden-key table by performing a logical operation between the at least one key table and a random bit string.

The hidden-key table generator may generate the at least one hidden-key table by moving elements in each of the at least one key table.

The hidden-key table generator may generate the at least one hidden-key table by combining the at least one key table.

The hidden-key table generator may generate the at least one hidden-key table by disassembling the at least one key table into a plurality of key tables.

The apparatus may further include a hiding method determinator configured to determine a conversion method for generating the at least one hidden-key table.

The apparatus may further include a decryption algorithm generator configured to generate a white-box implemented decryption algorithm by using the at least one key table and a decryptor configured to decrypt data, which is encrypted with the encryption algorithm, with the decryption algorithm.

According to another aspect of the present disclosure, there is provided a method for public key encryption using a white-box cipher algorithm, the method including generating at least one key table from a cipher key, generating at least one hidden-key table by performing conversion of the at least one key table, generating a white-box implemented encryption algorithm by using the at least one hidden-key table and an inverse operation of the conversion, and providing the encryption algorithm as a public key for encryption.

The generating of at least one hidden-key table may include generating the at least one hidden-key table by performing a logical operation between the at least one key table and a random bit string.

The generating of at least one hidden-key table may include generating the at least one hidden-key table by moving elements in each of the at least one key table.

The generating of at least one hidden-key table may include generating the at least one hidden-key table by combining the at least one key table.

The generating of at least one hidden-key table may include generating the at least one hidden-key table by disassembling the at least one key table into a plurality of key tables.

The method may further include determining a conversion method for generating the at least one hidden-key table.

The method may further include generating a white-box implemented decryption algorithm by using the at least one key table and decrypting data, which is encrypted with the encryption algorithm, with the decryption algorithm.

According to another aspect of the present disclosure, there is provided an apparatus for public key encryption using a white-box cipher algorithm, the apparatus including a key table generator configured to generate at least one encryption key table and at least one decryption key table from a cipher key, a first hidden-key table generator configured to generate at least one encryption hidden-key table by performing conversion of the at least one encryption key table in a first method, a second hidden-key table generator configured to generate at least one decryption hidden-key table by performing conversion of the at least one decryption key table in a second method different from the first method, an encryption algorithm generator configured to generate a white-box implemented encryption algorithm by using the at least one encryption hidden-key table and an inverse operation of the first method, a decryption algorithm generator configured to generate a white-box implemented decryption algorithm by using the at least one decryption hidden-key table and an inverse operation of the second method, and a key provider configured to provide one of the encryption algorithm and the decryption algorithm as a public key and provide the other as a private key.

The first hidden-key table generator may generate the at least one encryption hidden-key table by performing a logical operation between the at least one encryption key table and a random bit string.

The first hidden-key table generator may generate the at least one encryption hidden-key table by moving elements in each of the at least one encryption key table.

The first hidden-key table generator may generate the at least one encryption hidden-key table by combining the at least one encryption key table.

The first hidden-key table generator may generate the at least one encryption hidden-key table by disassembling the at least one encryption key table into a plurality of key tables.

The second hidden-key table generator may generate the at least one decryption hidden-key table by performing a logical operation between the at least one decryption key table and a random bit string.

The second hidden-key table generator may generate the at least one decryption hidden-key table by moving elements in each of the at least one decryption key table.

The second hidden-key table generator may generate the at least one decryption hidden-key table by combining the at least one decryption key table.

The second hidden-key table generator may generate the at least one decryption hidden-key table by disassembling the at least one decryption key table into a plurality of key tables.

The apparatus may further include a hiding method determinator configured to determine the first method and the second method.

According to another aspect of the present disclosure, there is provided a method for public key encryption using a white-box cipher algorithm, the method including generating at least one encryption key table and at least one decryption key table from a cipher key, generating at least one encryption hidden-key table by performing conversion of the at least one encryption key table in a first method; generating at least one decryption hidden-key table by performing conversion of the at least one decryption key table in a second method different from the first method, generating a white-box implemented encryption algorithm by using the at least one encryption hidden-key table and an inverse operation of the first method, generating a white-box implemented decryption algorithm by using the at least one decryption hidden-key table and an inverse operation of the second method, and providing one of the encryption algorithm and the decryption algorithm as a public key and providing the other as a private key.

The generating of at least one encryption hidden-key table may include generating the at least one encryption hidden-key table by performing a logical operation between the at least one encryption key table and a random bit string.

The generating of at least one encryption hidden-key table may include generating the at least one encryption hidden-key table by moving elements in each of the at least one encryption key table.

The generating of at least one encryption hidden-key table may include generating the at least one encryption hidden-key table by combining the at least one encryption key table.

The generating of at least one encryption hidden-key table may include generating the at least one encryption hidden-key table by disassembling the at least one encryption key table into a plurality of key tables.

The generating of at least one decryption hidden-key table may include generating the at least one decryption hidden-key table by performing a logical operation between the at least one decryption key table and a random bit string.

The generating of at least one decryption hidden-key table may include generating the at least one decryption hidden-key table by moving elements in each of the at least one decryption key table.

The generating of at least one decryption hidden-key table may include generating the at least one decryption hidden-key table by combining the at least one decryption key table.

The generating of at least one decryption hidden-key table may include generating the at least one decryption hidden-key table by disassembling the at least one decryption key table into a plurality of key tables.

The method may further include determining the first method and the second method.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only an example, and the present disclosure is not limited thereto.

In describing embodiments of the present disclosure, when it is determined that a detailed description of known techniques associated with the present disclosure would unnecessarily obscure the subject matter of the present disclosure, the detailed description thereof will be omitted. Also, terms used herein are defined in consideration of the functions of the present disclosure and may be changed depending on a user, the intent of an operator, or a custom. Accordingly, the terms must be defined based on the following overall description of this specification. The terminology used herein is for the purpose of only describing embodiments of the present disclosure and should not be restrictive. The singular forms "a," "an" and "the" are intended to include the plural forms as well, unless the context clearly indicates otherwise. It should be understood that the terms "comprises," "comprising," "includes" and/or "including" specify the presence of stated features, integers, steps, operations, elements, and/or components when used herein, but do not preclude the presence or addition of one or more other features, integers, steps, operations, elements, components, and/or groups thereof.

Figure 1:
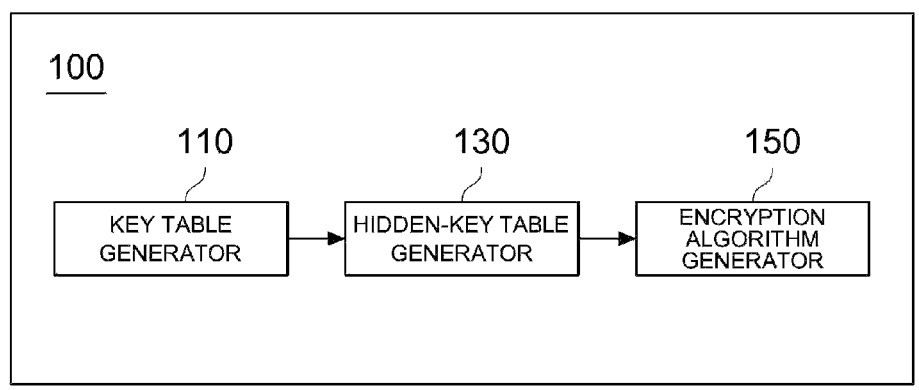
FIG. 1 is a block diagram of an apparatus for public key encryption with a white-box cipher algorithm according to an embodiment of the present disclosure.

FIG. 1 is a block diagram of the apparatus 100 for public key encryption with a white-box cipher algorithm according to an embodiment of the present disclosure.

Referring to FIG. 1, an apparatus 100 for public key encryption with a white-box cipher algorithm according to an embodiment of the present disclosure (hereinafter referred to as an encryption apparatus) includes a key table generator 110, a hidden-key table generator 130, and an encryption algorithm generator 150.

The encryption apparatus 100 shown in FIG. 1 may be implemented as an element of a computing apparatus for performing data encryption/decryption based on a public key. In this case, the computing apparatus may include, for example, a smartphone, a personal digital assistant (PDA), a phablet, a desktop PC, a laptop PC, a tablet PC, a server, and a sensor, but is not limited thereto. As long as an apparatus has a data encryption/decryption function, the apparatus is not limited to its name and form.

The key table generator 110 generates at least one key table from a cipher key.

Figure 4:
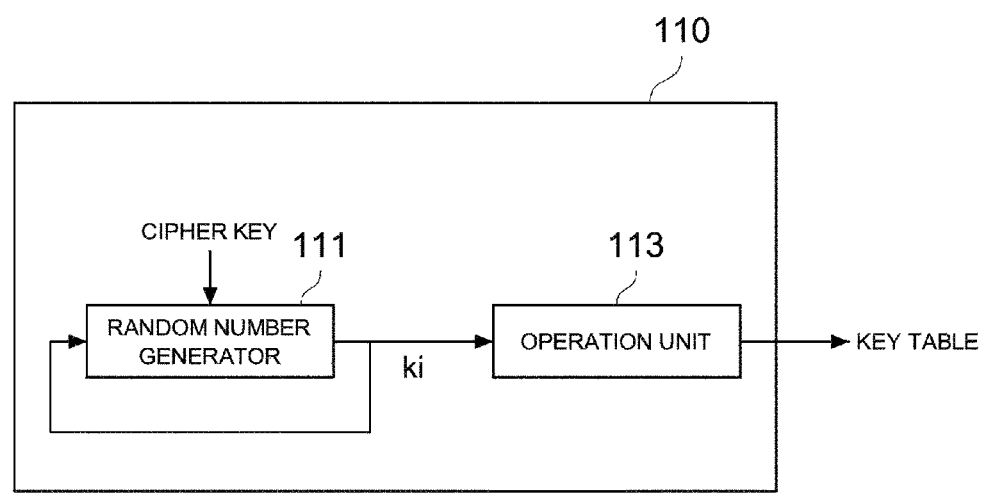
FIG. 4 is a block diagram of a key table generator according to an embodiment of the present disclosure.

In detail, referring to FIG. 4, the key table generator 110 according to an embodiment of the present disclosure may include a random number generator 111 configured to generate a plurality of sub-keys from the cipher key and an operation unit 113 configured to generate a key table using each of the generated sub-keys.

The random number generator 111 may receive the cipher key, generate a sub-key 'ki', and generate a new sub-key from the generated sub-key 'ki'.

For example, when it is assumed that three sub-keys are generated, the random number generator 111 may generate a first sub-key by generating a random number from the received cipher key. Subsequently, the random number generator 111 may generate a second sub-key by generating a random number from the generated first sub-key and then may generate a third sub-key by generating a random number from the generated second sub-key.

The operation unit 113 may generate random values for configuring a key table from the sub-keys generated by the random number generator 111 and generate the key table including the generated random values.

For example, the operation unit 113 may generate random values by using a round function for generating a random value. In detail, the operation unit 113 may generate random values by applying each sub-key to the round function every round.

Figure 5:
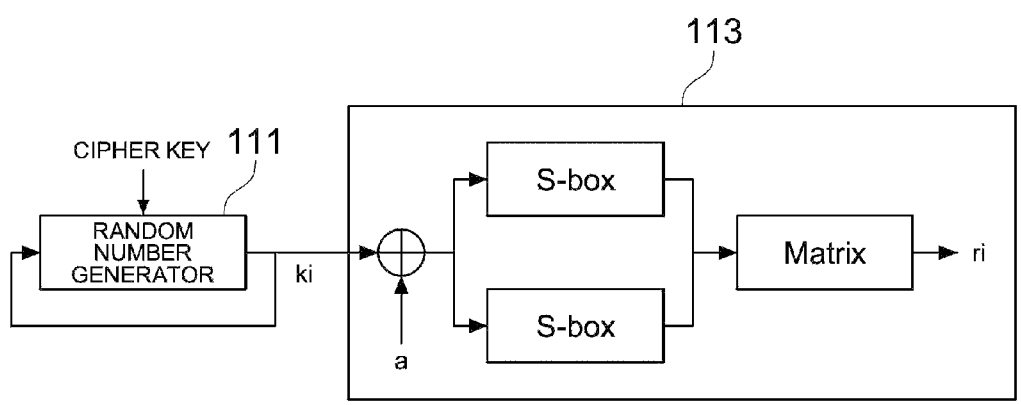
FIG. 5 is a diagram showing an example of a round function that is used in an operation unit according to an embodiment of the present disclosure.

FIG. 5 is a diagram showing an example of a round function used by the operation unit 113.

Referring to FIG. 5, the operation unit 113 may perform an XOR operation between the sub-key 'ki' generated by the random number generator 111 and a random value 'a' with the same size as the sub-key 'ki' and may divide a result of the XOR operation into two parts and apply the two parts to respective S-boxes.

Subsequently, the operation unit 113 may perform a matrix operation on output result values of the two S-boxes to generate a random value 'ri'. In this case, various matrix operations having characteristics for maximizing a diffusion effect on an input value, such as a matrix operation using a maximum distance separable (MDS) matrix, may be used as the matrix operation.

The generation of a key table performed by the key table generator 110 is not limited to the examples shown in FIGS. 4 and 5. For example, the key table generator 110 may generate a key table from a cipher key in various methods having a one-way property other than those shown in FIGS. 4 and 5.

The hidden-key table generator 130 generates at least one hidden-key table by performing conversion of at least one key table generated by the key table generator 110.

In this case, various methods may be used to generate the hidden-key table.

Figure 6:
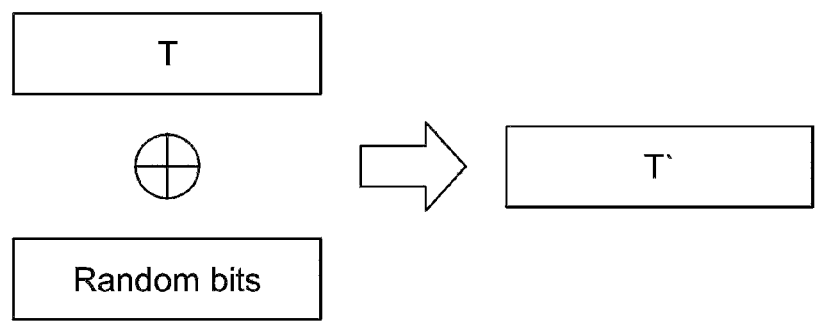
FIGS. 6 to 9 are diagrams of an example of generating a hidden-key table according to an embodiment of the present disclosure.

In detail, FIG. 6 is a diagram showing an example of generating a hidden-key table.

Referring to FIG. 6, the hidden-key table generator 130 may perform an logical operation, for example, an XOR operation, on the key table generated by the key table generator 110 and random bit string to generate a hidden-key table T'.

Figure 7:
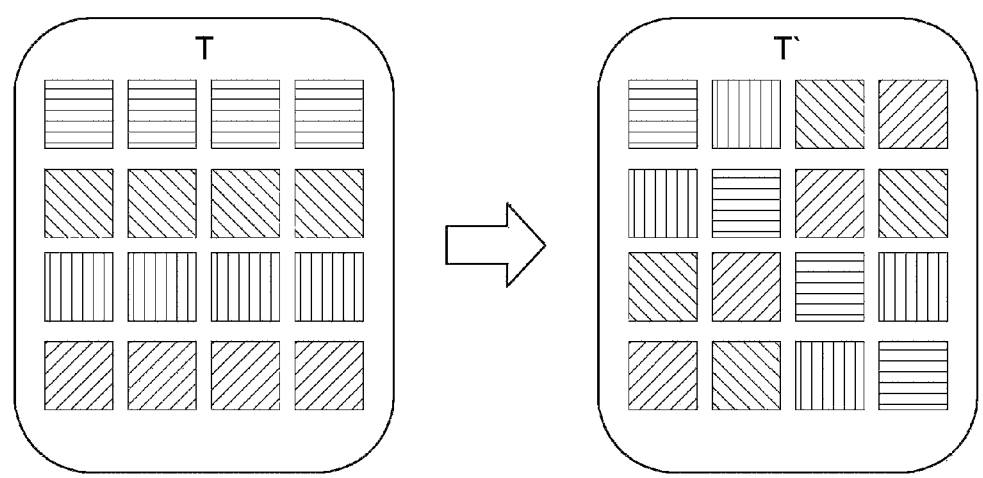

FIG. 7 is a diagram showing another example of generating a hidden-key table.

Referring to FIG. 7, the hidden-key table generator 130 may change positions of elements in a key table T generated by the key table generator 110 to generate the hidden-key table T'.

Figure 8:
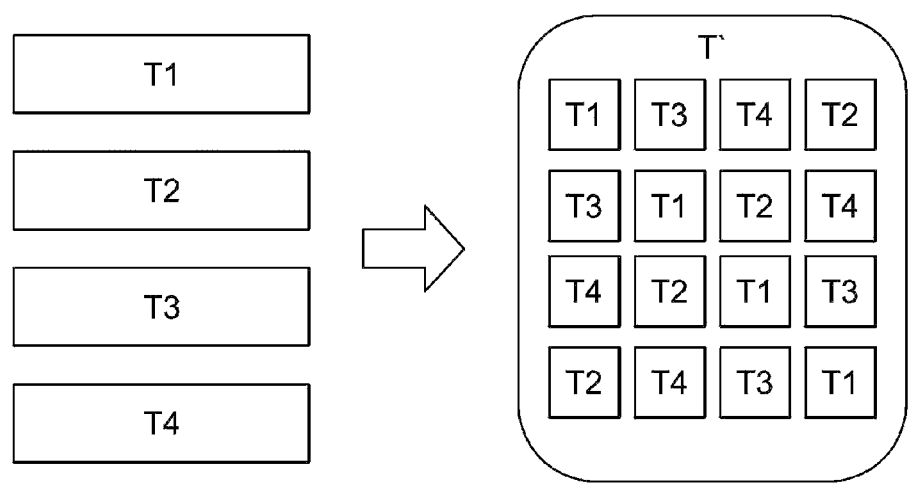

FIG. 8 is a diagram showing still another example of generating a hidden-key table.

Referring to FIG. 8, the hidden-key table generator 130 may assemble a plurality of key tables T1 to T4 generated by the key table generator 110 to generate the hidden-key table T'.

Figure 9:
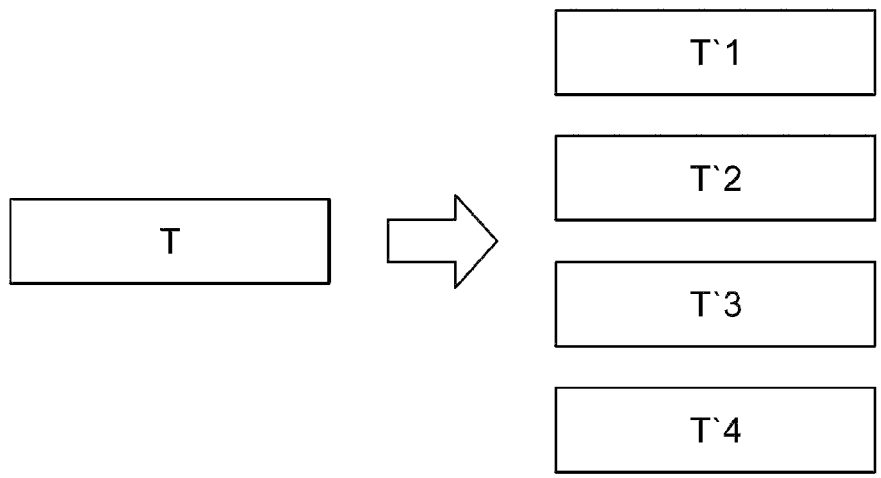

FIG. 9 is a diagram showing still another example of generating a hidden-key table.

Referring to FIG. 9, the hidden-key table generator 130 may disassemble the key table T generated by the key table generator 110 to generate a plurality of hidden-key tables T'1 to T'4.

For example, each of the hidden-key tables T' 1 to T'4 may be generated by performing a logical operation between the key table T and different random bit strings.

Another example, the hidden-key tables T'1 to T'4 may be generated by changing positions of elements of the key table T in different methods.

As still another example, the hidden-key tables T'1 to T'4 may be generated by disassembling the key table T. In this case, the key table T may be generated through logical operations or arithmetic operations between the hidden-key tables T'1 to T'4.

The generation of a hidden-key table performed by the hidden-key table generator 130 is not limited to the examples shown in FIGS. 6 and 9. The hidden-key table may be generated in various methods other than the shown examples.

The encryption algorithm generator 150 generates an encryption algorithm in which a white-box is implemented using the hidden-key table generated by the hidden-key table generator 130 and an inverse operation of the conversion method used to generate the hidden-key table, and reveals the generated encryption algorithm as a public key for encryption.

In this case, the inverse operation is intended to generate a key table as it was before conversion to the hidden-key table from the hidden-key table and may differ depending on the conversion methods used to generate the hidden-key table.

For example, when the hidden-key table is generated according to the example shown in FIG. 6, the inverse operation may be an XOR operation between the hidden-key table T' and a random bit string used to generate the hidden-key table T'.

As another example, when the hidden-key table is generated according to the example shown in FIG. 7, the inverse operation may be an operation for changing positions of elements of the hidden-key table T' to those of the original key table T.

As still another example, when the hidden-key table is generated according to the example shown in FIG. 8, the inverse operation may be an operation for disassembling elements of the hidden-key table T' to generate the original key tables T1 to T4.

As still another example, when the hidden-key table is generated according to the example shown in FIG. 9, the inverse operation may be an operation for generating the original key table T from the hidden-key tables T'1 to T'4.

According to an embodiment of the present disclosure, the encryption algorithm generated by the encryption algorithm generator 150 may be a white-box implemented encryption algorithm based on a symmetric-key cipher algorithm such as, for example, an Advanced Encryption Standard (AES) algorithm, a Data Encryption Standard (DES) algorithm, a 3DES algorithm, an International Data Encryption (IDEA) algorithm, and a Blowfish algorithm.

Figure 10:
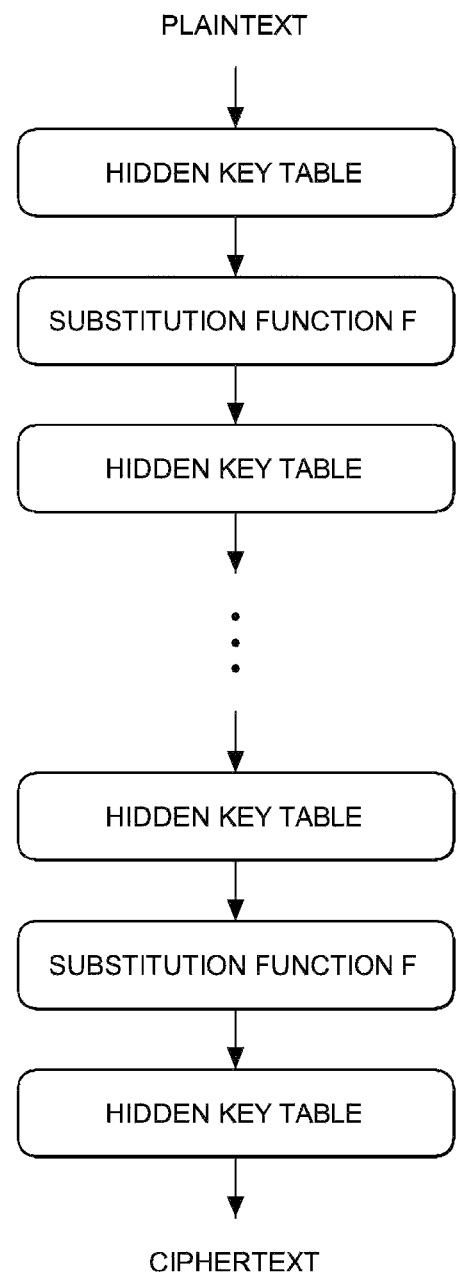
FIGS. 10 and 11 are diagrams of an example of a cipher algorithm according to an embodiment of the present disclosure.

As a detailed example, the encryption algorithm generated by the encryption algorithm generator 150 may be an encryption algorithm generated by alternately and repeatedly combining a substitution function F and the hidden-key table generated by the hidden-key table generator 130 on the basis of, for example, the Even-Mansour scheme as shown in FIG. 10.

In this case, the substitution function F may refer to any function that is cryptographically safe and configured to output input values as different values having the same length.

For example, the substitution function F may include a cipher algorithm such as an AES algorithm, a DES algorithm, a 3DES algorithm, an IDEA algorithm, and a Blowfish algorithm and an inverse operation for converting a hidden-key table into a pre-conversion key table.

Figure 11:
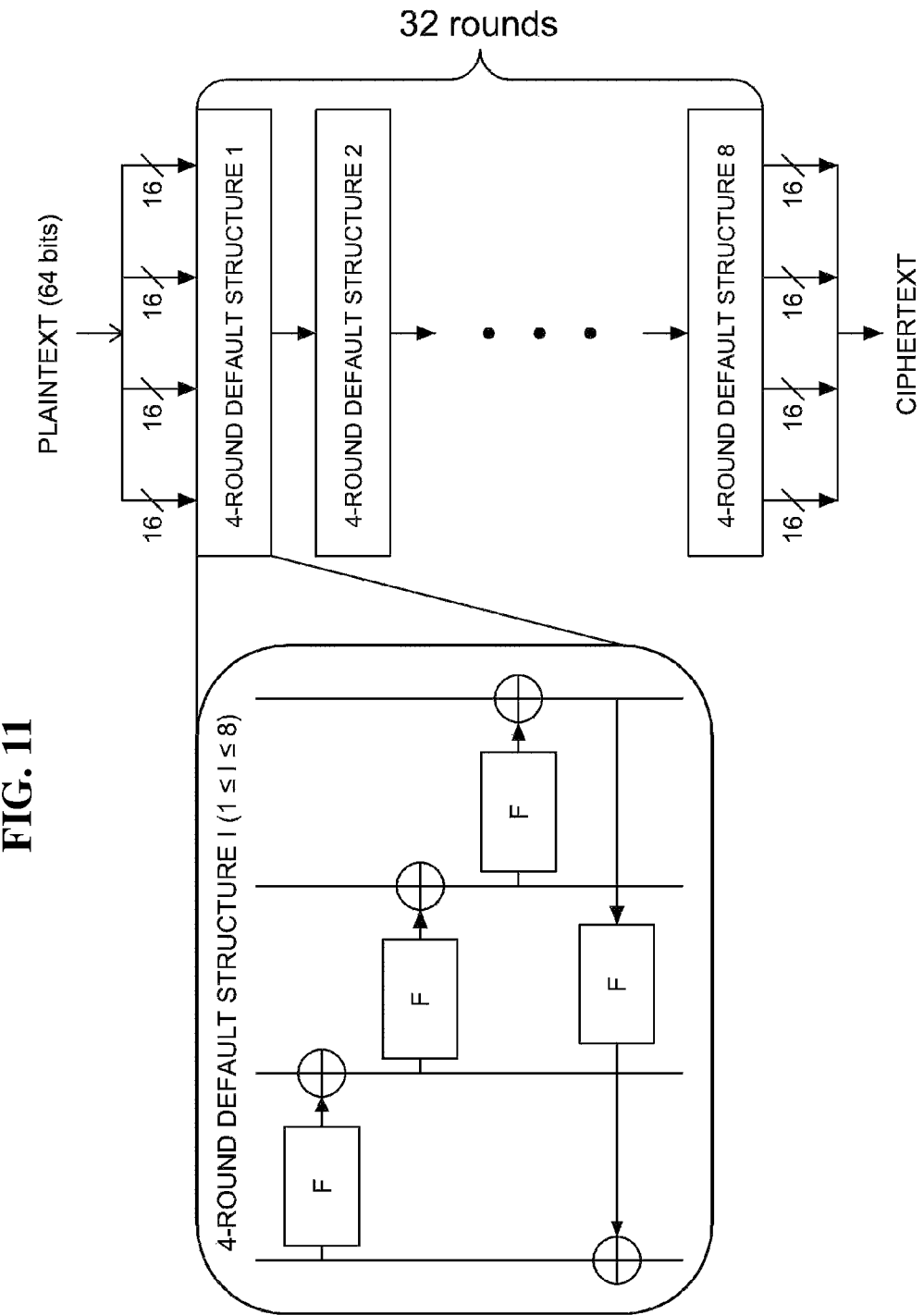

As another example, the encryption algorithm generated by the encryption algorithm generator 150 may be an encryption algorithm obtained by applying the hidden-key table generated by the hidden-key table generator 130 and the inverse operation for converting the hidden-key table into the pre-converted key table to each round function F of a Feistel structure of a Feistel-structured encryption algorithm such as, for example, a DES algorithm as shown in FIG. 11.

The encryption algorithm generated by the encryption algorithm generator 150 according to an embodiment of the present disclosure is not limited to the above examples and may include various types of encryption algorithms that can be implemented in a white-box using the hidden-key table generated by the hidden-key table generator 130 and the inverse operation of the conversion method used to generate the hidden-key table.

Figure 2:
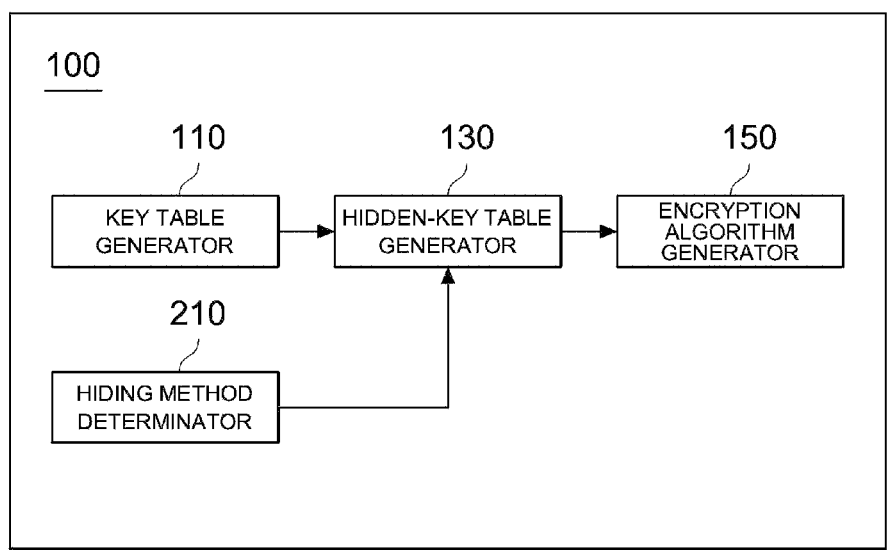
FIGS. 2 and 3 are block diagrams of apparatuses for public key encryption with a white-box cipher algorithm according to additional embodiments of the present disclosure.

According to an embodiment of the present disclosure, the encryption apparatus 100 may further include a hiding method determinator 210 as shown in FIG. 2.

The hiding method determinator 210 may determine a conversion method for generating a hidden-key table.

For example, when a key table is generated by the key table generator 110, the hiding method determinator 210 may select one of a plurality of applicable conversion methods in order to convert the generated key table into a hidden-key table.

In this case, for example, the hiding method determinator 210 may select one of the plurality of conversion methods arbitrarily or depending on a size of the key table generated by the key table generator 110.

However, the selection of a conversion method by the hiding method determinator 210 is not limited to the above example and may be made according to various criteria other than the above example.

Also, the plurality of conversion methods may include, for example, the methods shown in FIGS. 6 to 9, but are not limited thereto. The conversion methods may include various conversion methods other than those shown in FIGS. 6 to 9.

When a conversion method is determined by the hiding method determinator 210, the hidden-key table generator 130 may convert the key table generated by the key table generator 110 according to the determined conversion method to generate a hidden-key table.

Figure 3:
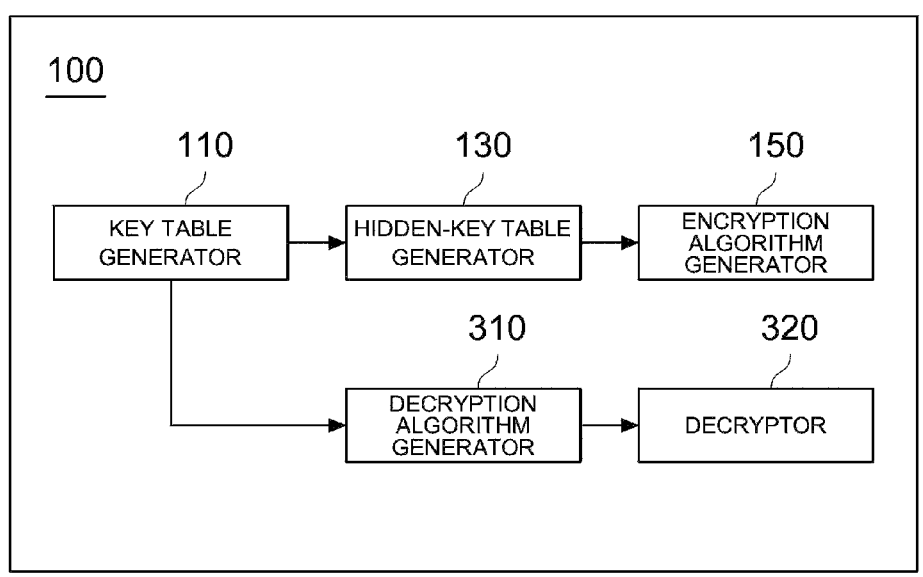

According to an embodiment of the present disclosure, the encryption apparatus 100 may further include a decryption algorithm generator 310 and a decryptor 330 as shown in FIG. 3.

The decryption algorithm generator 310 may generate a white-box implemented decryption algorithm by using the key table generated by the key table generator 110.

In this case, for example, the decryption algorithm may have the same structure as the encryption algorithm generated by the encryption algorithm generator 150, but may be different from the encryption algorithm in that the decryption algorithm is generated by using the key table generated by the key table generator 110 rather than the hidden-key table and does not include the inverse operation for the hidden-key table.

The decryptor 330 may decrypt data, which is encrypted with the encryption algorithm generated by the encryption algorithm generator 150, with the decryption algorithm generated by the decryption algorithm generator 310.

In an embodiment of the present disclosure, the key table generator 110, the hidden-key table generator 130, the encryption algorithm generator 150, the hiding method determinator 210, the decryption algorithm generator, and the decryptor 330 may be implemented on a computing apparatus including at least one processor and a computer-readable recording medium connected with the processor. The computer-readable recording medium may be disposed inside or outside the processor, and may be connected with the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 12:
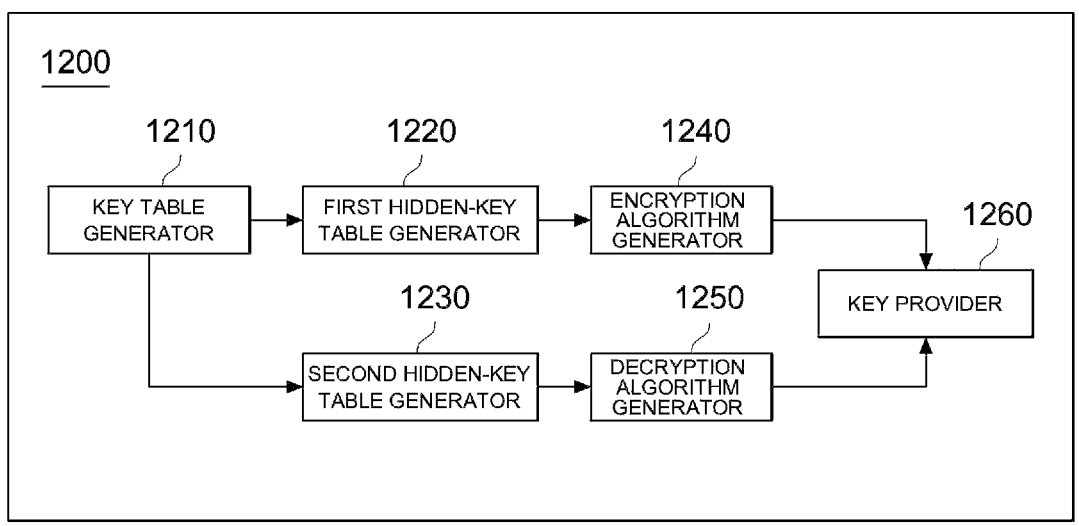
FIG. 12 is a block diagram of an apparatus for public key encryption with a white-box cipher algorithm according to another embodiment of the present disclosure.

FIG. 12 is a block diagram of an encryption apparatus according to another embodiment of the present disclosure.

Referring to FIG. 12, an encryption apparatus 1200 according to another embodiment of the present disclosure includes a key table generator 1210, a first hidden-key table generator 1220, a second hidden-key table generator 1230, an encryption algorithm generator 1240, a decryption algorithm generator 1250, and a key provider 1260.

The encryption apparatus 1200 shown in FIG. 12 may be implemented as an element of a key issuing apparatus for issuing a public key and a private key for encryption/decryption to a computing apparatus that performs data encryption/decryption.

The key table generator 1210 generates at least one encryption key table and at least one decryption key table from a cipher key.

In this case, the encryption key table and the decryption key table may have different values.

For example, the key table generator 1210 may generate the encryption key table and the decryption key table in the same method as shown in FIGS. 4 and 5, but is not limited thereto. The key table generator 1210 may generate an encryption key table and a decryption key table, which have different values, from the cipher key in various methods having a one-way property other than those shown in FIGS. 4 and 5.

The first hidden-key table generator 1220 converts at least one encryption key table generated by the key table generator 1210 into at least one encryption hidden-key table.

In this case, the encryption hidden-key table may be generated in the same method as shown in FIGS. 6 to 9, but is not limited thereto. The encryption hidden-key table may be generated in various methods other than those shown in FIGS. 6 to 9.

The second hidden-key table generator 1230 converts at least one decryption key table generated by the key table generator 1210 into at least one decryption hidden-key table.

In this case, according to an embodiment of the present disclosure, the second hidden-key table generator 1230 may generate a decryption hidden-key table in a different method from the conversion method used by the first hidden-key table generator 1220 to generate the encryption hidden-key table.

For example, when the first hidden-key table generator 1220 generates an encryption hidden-key table by performing an XOR operation between the encryption key table and a random bit string, as shown in FIG. 6, the second hidden-key table generator 1230 may generate a decryption hidden-key table by performing an XOR operation between the decryption key table and a random bit string that is different from the bit string used to generate the encryption hidden-key table.

As another example, when the first hidden-key table generator 1220 generates an encryption hidden-key table by moving elements in the encryption key table, as shown in FIG. 7, the second hidden-key table generator 1230 may generate a decryption hidden-key table by moving elements in the decryption key table in a different method from that of the encryption hidden-key table.

As still another example, when the first hidden-key table generator 1220 generates an encryption hidden-key table by combining a plurality of encryption key tables, as shown in FIG. 8, the second hidden-key table generator 1230 may generate a decryption hidden-key table by combining a plurality of decryption key tables in a different method from that of the encryption key table.

As still another example, when the first hidden-key table generator 1220 generates a plurality of encryption hidden-key tables by disassembling the encryption key table as shown in FIG. 9, the second hidden-key table generator 1230 may generate a plurality of decryption hidden-key tables by disassembling the decryption key table in a different method from that of the encryption hidden-key table.

The encryption algorithm generator 1240 generates a white-box implemented encryption algorithm by using the encryption hidden-key table generated by the first hidden-key table generator 1220 and an inverse operation of the conversion method used to generate the encryption hidden-key table.

Also, the decryption algorithm generator 1250 generates a white-box implemented decryption algorithm by using the decryption hidden-key table generated by the second hidden-key table generator 1230 and an inverse operation of the conversion method used to generate the decryption hidden-key table.

In this case, the inverse operation used by the encryption algorithm generator 1240 may differ depending on the conversion method used to generate the encryption hidden-key table.

Also, the inverse operation used by the decryption algorithm generator 1250 may differ depending on the conversion method used to generate the decryption hidden-key table.

For example, when the encryption hidden-key table is generated as shown in FIG. 6, the inverse operation used by the encryption algorithm generator 1240 may be an XOR operation between the encryption hidden-key table and a random bit string used to generate the encryption hidden-key table.

Likewise, when the decryption hidden-key table is generated as shown in FIG. 6, the inverse operation used by the decryption algorithm generator 1250 may be an XOR operation between the decryption hidden-key table and a random bit string used to generate the decryption hidden-key table.

As another example, when the encryption hidden-key table is generated as shown in FIG. 7, the inverse operation used by the encryption algorithm generator 1240 may be an operation for moving the elements in the encryption hidden-key table to the same positions as those in the encryption key table.

Likewise, when the decryption hidden-key table is generated as shown in FIG. 7, the inverse operation used by the decryption algorithm generator 1250 may be an operation for moving the elements in the decryption hidden-key table to the same positions as those in the decryption key table.

As still another example, when the encryption hidden-key table is generated as shown in FIG. 8, the inverse operation used by the encryption algorithm generator 1240 may be an operation for generating the encryption key tables that are combined to generate the encryption hidden-key table by disassembling the elements in the encryption hidden-key table.

Likewise, when the decryption hidden-key table is generated as shown in FIG. 8, the inverse operation used by the decryption algorithm generator 1250 may be an operation for generating the decryption key tables that are combined to generate the decryption hidden-key table by disassembling the elements in the decryption hidden-key table.

As still another example, when the encryption hidden-key table is generated as shown in FIG. 9, the inverse operation used by the encryption algorithm generator 1240 may be an operation for generating the encryption key table from the encryption hidden-key tables.

Likewise, when the decryption hidden-key table is generated as shown in FIG. 9, the inverse operation used by the decryption algorithm generator 1250 may be an operation for generating the decryption key table from the decryption hidden-key tables.

According to an embodiment of the present disclosure, each of the encryption algorithm and the decryption algorithm generated by the encryption algorithm generator 1240 and the decryption algorithm generator 1250 may be a white-box implemented algorithm based on a symmetric-key cipher algorithm such as, for example, an AES algorithm, a DES algorithm, a 3DES algorithm, IDEA algorithm, and a Blowfish algorithm.

As a detailed example, the encryption algorithm generated by the encryption algorithm generator 1240 may be an encryption algorithm generated by alternately and repeatedly combining the substitution function F and the encryption hidden-key table generated by the first hidden-key table generator 1220 on the basis of, for example, the Even-Mansour scheme as shown in FIG. 10.

In this case, the substitution function F may refer to any form of function that is cryptographically safe and configured to output input values as different values having the same length.

For example, the substitution function F may include a cipher algorithm such as an AES algorithm, a DES algorithm, a 3DES algorithm, an IDEA algorithm, and a Blowfish algorithm and an inverse operation for converting the encryption hidden-key table into the encryption key table.

Likewise, the decryption algorithm generated by the decryption algorithm generator 1250 may be a decryption algorithm generated by alternately and repeatedly combining the substitution function F and the decryption hidden-key table generated by the second hidden-key table generator 1230 on the basis of, for example, the Even-Mansour scheme as shown in FIG. 10.

In this case, the substitution function F may refer to any form of function that is cryptographically safe and configured to output input values as different values having the same length.

For example, the substitution function F may include a cipher algorithm such as an AES algorithm, a DES algorithm, a 3DES algorithm, an IDEA algorithm, and a Blowfish algorithm and an inverse operation for converting the decryption hidden-key table into the decryption key table.

As another example, the encryption algorithm generated by the encryption algorithm generator 1240 may be an encryption algorithm obtained by applying the encryption hidden-key table generated by the first hidden-key table generator 1220 and the inverse operation for converting the encryption hidden-key table into the encryption key table to each round function F of a Feistel structure of an encryption algorithm such as, for example, a DES algorithm as shown in FIG. 11.

Likewise, the decryption algorithm generated by the decryption algorithm generator 1250 may be a decryption algorithm obtained by applying the decryption hidden-key table generated by the second hidden-key table generator 1230 and the inverse operation for converting the decryption hidden-key table into the decryption key table to each round function F of a Feistel structure of a decryption algorithm such as, for example, a DES algorithm as shown in FIG. 11.

The encryption algorithm generated by the encryption algorithm generator 1240 according to an embodiment of the present disclosure is not limited to the above examples and may include various types of encryption algorithms that can be implemented in a white-box using the encryption hidden-key table generated by the first hidden-key table generator 1220 and the inverse operation of the conversion method used to generate the encryption hidden-key table.

Also, the decryption algorithm generated by the decryption algorithm generator 1250 according to an embodiment of the present disclosure is not limited to the above examples and may additionally include various types of decryption algorithms that can be implemented in a white-box using the decryption hidden-key table generated by the second hidden-key table generator 1230 and the inverse operation of the conversion method used to generate the decryption hidden-key table.

The key provider 1260 may provide one of the encryption algorithm generated by the encryption algorithm generator 1240 and the decryption algorithm generated by the decryption algorithm generator 1250 as a public key and may provide the other as a private key.

For example, when the encryption algorithm and the decryption algorithm are received from the key provider 1260 as a public key and a private key, respectively, a computing apparatus may reveal the encryption algorithm as the public key and safely store, rather than reveal, the decryption algorithm. In this case, another computing apparatus may encrypt data with the encryption algorithm revealed as the public key and transmit the data to the computing apparatus that has revealed the encryption algorithm, and the computing apparatus may decrypt the encrypted data with the decryption algorithm when the encrypted data is received.

Figure 13:
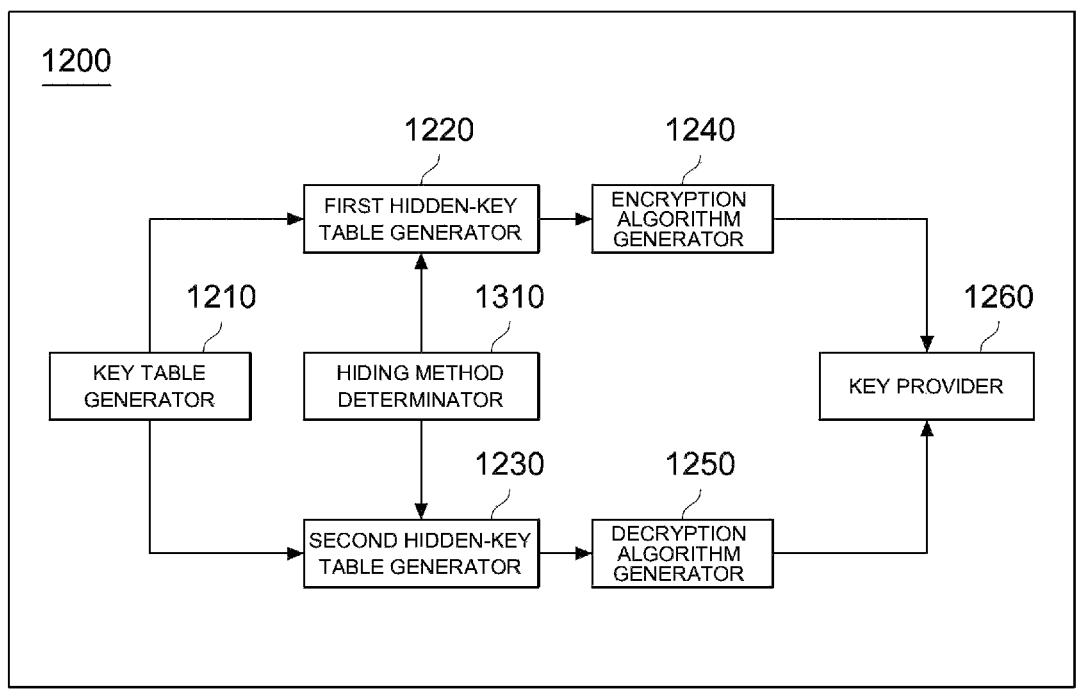
FIG. 13 is a block diagram of an apparatus for public key encryption with a white-box cipher algorithm according to an additional embodiment of the present disclosure.

According to an embodiment of the present disclosure, the encryption apparatus 1200 may further include a hiding method determinator 1310 as shown in FIG. 13.

The hiding method determinator 1310 may determine a conversion method for generating an encryption hidden-key table and a decryption hidden-key table.

For example, when an encryption key table and a decryption key table are generated by the key table generator 1210, the hiding method determinator 1310 may select one of a plurality of conversion methods applicable to each of the encryption key table and the decryption key table. In this case, a conversion method selected for the encryption key table may be different from a conversion method selected for the decryption key table.

In this case, for example, the hiding method determinator 1310 may select one of the plurality of conversion methods arbitrarily or depending on sizes of the encryption key table and the decryption key table generated by the key table generator 1210. However, the selection of a conversion method by the hiding method determinator 1310 is not limited to the above example and may be made according to various criteria other than the above example.

Also, the plurality of conversion methods may include, for example, the methods shown in FIGS. 6 to 9, but are not limited thereto. The conversion methods may include various conversion methods other than those shown in FIGS. 6 to 9.

When a conversion method for the encryption key table and a conversion method for the decryption key table are determined by the hiding method determinator 1310, the first hidden-key table generator 1220 and the second hidden-key table generator 1230 may generate the encryption hidden-key table and the decryption hidden-key table according to the determined conversion methods.

In an embodiment of the present disclosure, the key table generator 1210, the first hidden-key table generator 1220, the second hidden-key table generator 1230, the encryption algorithm generator 1240, the decryption algorithm generator 1250, the key provider 1260, and the hiding method determinator 1310 may be implemented on a computing apparatus including at least one processor and a computer-readable recording medium connected with the processor. The computer-readable recording medium may be disposed inside or outside the processor, and may be connected with the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 14:
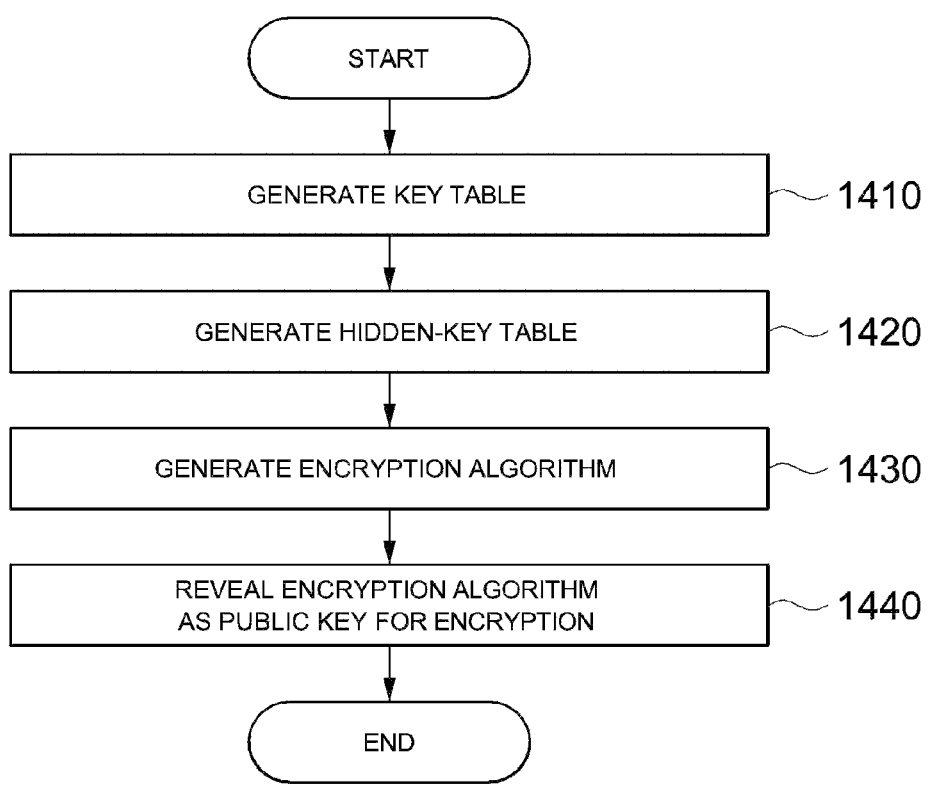
FIG. 14 is a flowchart of a method for public key encryption with a white-box cipher algorithm according to an embodiment of the present disclosure.

FIG. 14 is a flowchart of a method for public key encryption with a white-box cipher algorithm according to an embodiment of the present disclosure.

The method shown in FIG. 14 may be performed by one of the encryption apparatuses 100 shown in FIGS. 1 to 3.

Referring to FIG. 14, first, the encryption apparatus 100 generates at least one key table from a cipher key (1410).

Subsequently, the encryption apparatus 100 converts the at least one key table into at least one hidden-key table (1420).

In this case, depending on an embodiment, the encryption apparatus 100 may select one of a plurality of conversion methods to generate a hidden-key table from a key table. In this case, for example, a conversion method may be selected by selecting one of the plurality of conversion methods arbitrarily or depending on a size of the generated key table.

However, the selection of a conversion method is not limited to the above example and may be made according to various criteria other than the above example.

Also, the plurality of conversion methods may include, for example, the methods shown in FIGS. 6 to 9, but are not limited thereto. The conversion methods may include various conversion methods other than those in FIGS. 6 to 9.

Subsequently, the encryption apparatus 100 generates a white-box implemented encryption algorithm by using the generated hidden-key table and an inverse operation of the conversion method used to generate the hidden-key table (1430).

Subsequently, the encryption apparatus 100 reveals the generated encryption algorithm as a public key for encryption (1440).

Figure 15:
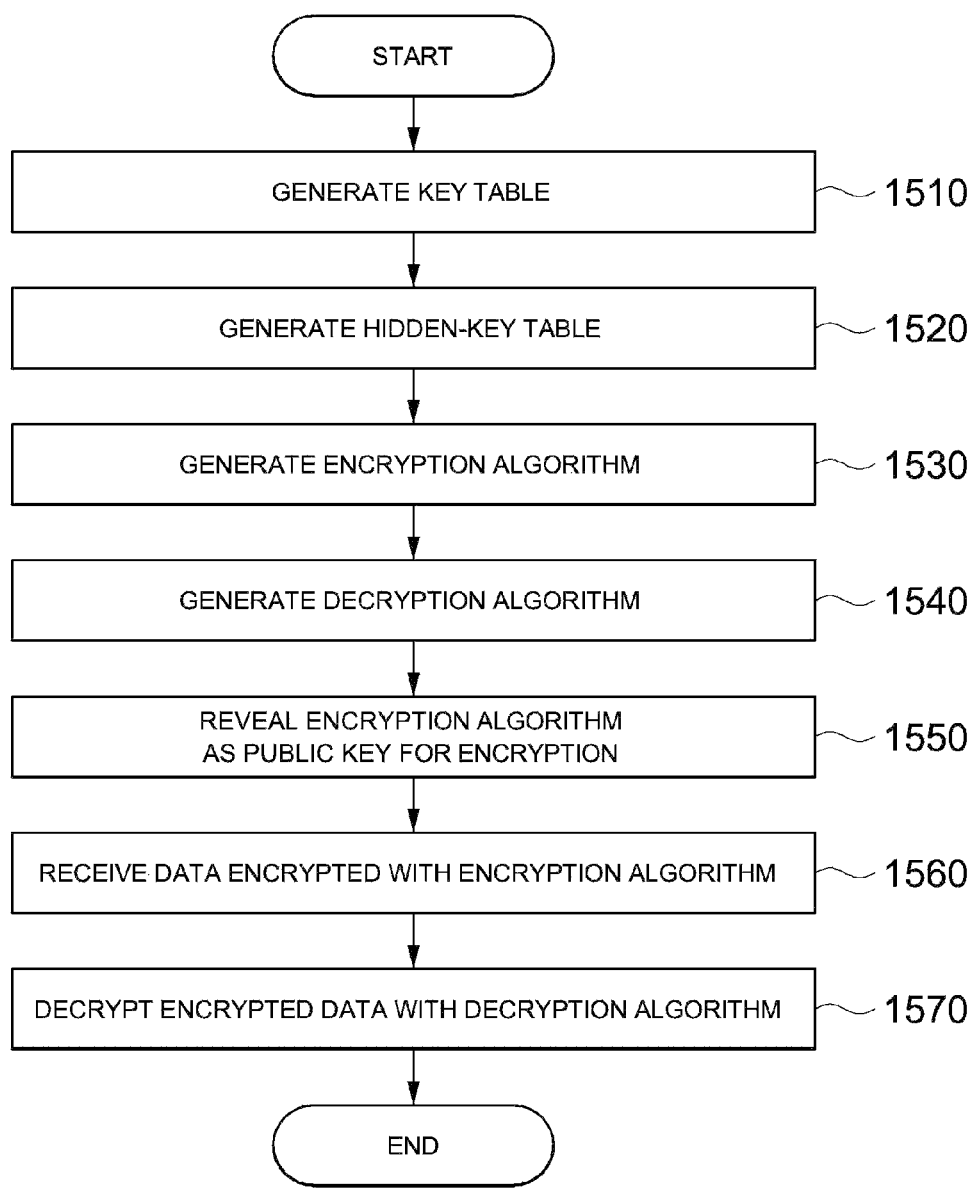
FIG. 15 is a flowchart of a method for public key encryption with a white-box cipher algorithm according to an additional embodiment of the present disclosure.

FIG. 15 is a flowchart of a method for public key encryption with a white-box cipher algorithm according to an additional embodiment of the present disclosure.

The method shown in FIG. 15 may be performed by the encryption apparatus 100 shown in FIG. 3.

Referring to FIG. 15, first, the encryption apparatus 100 generates at least one key table from a cipher key (1510).

Subsequently, the encryption apparatus 100 converts the at least one key table into at least one hidden-key table (1520).

Subsequently, the encryption apparatus 100 generates a white-box implemented encryption algorithm by using the generated hidden-key table and an inverse operation of the conversion method used to generate the hidden-key table (1530).

Subsequently, the encryption apparatus 100 generates a white-box implemented decryption algorithm by using the generated key table (1540).

Subsequently, the encryption apparatus 100 reveals the generated encryption algorithm as a public key for encryption (1550).

Subsequently, the encryption apparatus 100 receives data encrypted with the encryption algorithm revealed as the public key (1560).

Subsequently, the encryption apparatus 100 decrypts the encrypted data with the decrypt algorithm (1570).

Figure 16:
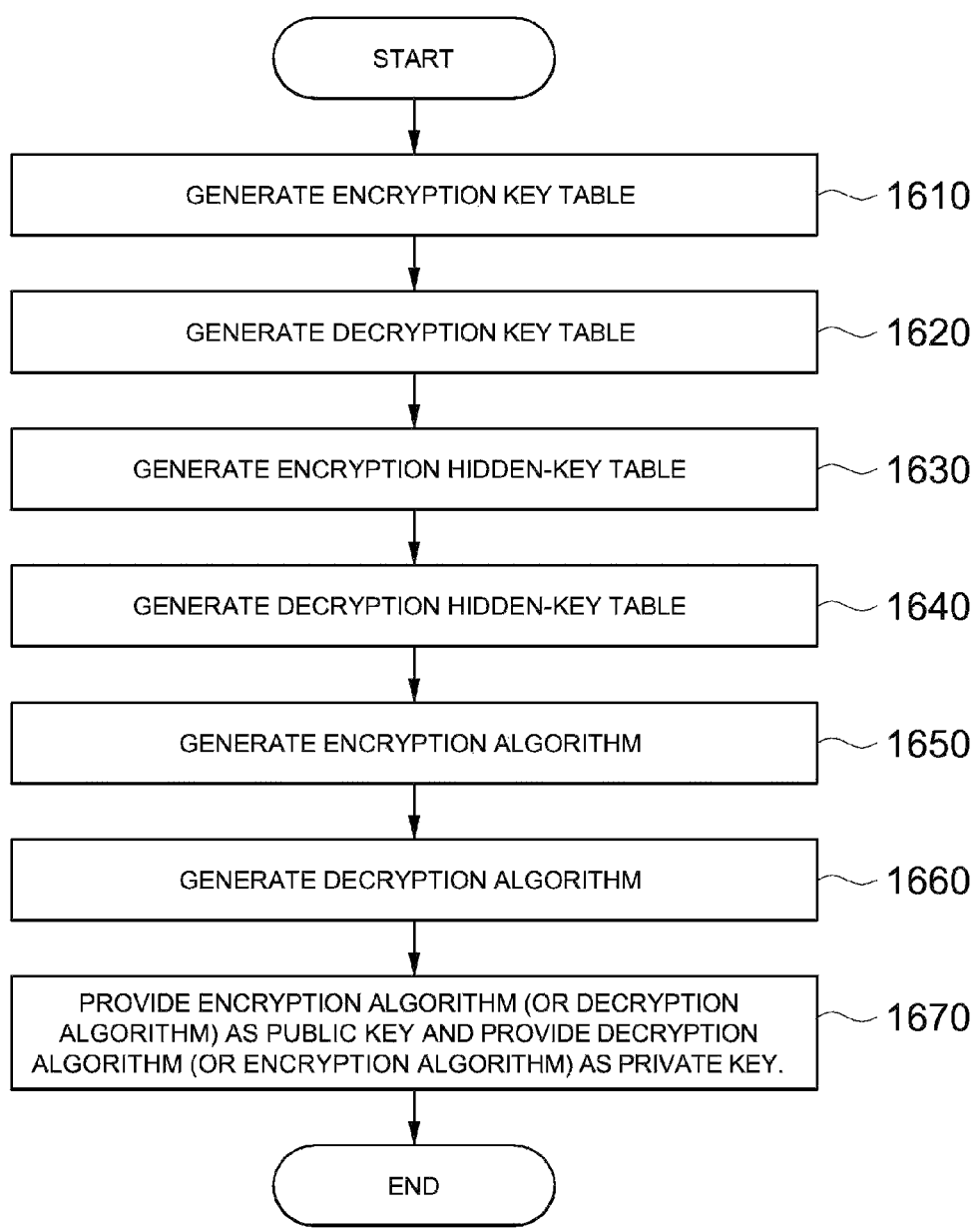
FIG. 16 is a flowchart of a method for public key encryption with a white-box cipher algorithm according to another embodiment of the present disclosure.

FIG. 16 is a flowchart of a method for public key encryption with a white-box cipher algorithm according to another embodiment of the present disclosure.

The method shown in FIG. 16 may be performed by the encryption apparatus 1200 shown in FIG. 12 or 13.

Referring to FIG. 16, first, the encryption apparatus 1200 generates at least one encryption key table from a cipher key (1610).

Subsequently, the encryption apparatus 1200 generates at least one decryption key table from a cipher key (1620).

Subsequently, the encryption apparatus 1200 converts the generated encryption key table into at least one encryption hidden-key table (1630).

Subsequently, the encryption apparatus 1200 converts the generated decryption key table into at least one decryption hidden-key table (1640).

In this case, the decryption hidden-key table may be generated using a method that is different from the conversion method used to generate the encryption hidden-key table.

Also, depending on an embodiment, the encryption apparatus 1200 may select a conversion method for generating the encryption hidden-key table and a conversion method for generating the decryption hidden-key table among a plurality of conversion methods.

In this case, the plurality of conversion methods may include, for example, the methods shown in FIGS. 6 to 9, but are not limited thereto. The conversion methods may include various conversion methods other than those shown in FIGS. 6 to 9.

Subsequently, the encryption apparatus 1200 generates a white-box implemented encryption algorithm by using the generated encryption hidden-key table and an inverse operation of the conversion method used to generate the encryption hidden-key table (1650).

Subsequently, the encryption apparatus 1200 generates a white-box implemented decryption algorithm by using the generated decryption hidden-key table and an inverse operation of the conversion method used to generate the decryption hidden-key table (1660).

Subsequently, the encryption apparatus 1200 provides one of the generated encryption algorithm and decryption algorithm as a public key and provides the other as a private key (1670).

In the flowcharts shown in FIGS. 14 to 16, the methods have been described as having a plurality of steps. However, at least some of the steps may be performed in a changed order, performed in combination with another step, omitted, divided into sub-steps, or performed in addition to one or more steps that are not shown. Embodiments of the present disclosure may include a computer-readable recording medium including a program for executing the methods described herein on a computer. The computer-readable recording medium may include any one or a combination of a program instruction, a local data file, a local data structure, etc. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a CD-ROM and a DVD, a magneto-optical medium, such as a floptical disk, and a hardware device specially configured to store and perform a program instruction, such as a ROM, a RAM, and a flash memory. Examples of the program instruction may include a machine code generated by a compiler and a high-level language code that can be executed in a computer using an interpreter.

According to embodiments of the present disclosure, by additionally providing a method of hiding key tables generated from a hidden cipher key, as well as utilizing the cipher key as a private key upon implementation of a white box, it is possible to perform a safe public key encryption function even when a hidden key table is stolen by an attacker.

Although example embodiments of the present disclosure have been described in detail, it will be understood by those skilled in the art that various changes may be made without departing from the spirit or scope of the present disclosure. Thus, the scope of the present disclosure is to be determined by the following claims and their equivalents, and shall not be restricted or limited by the foregoing detailed description.

What is claimed is:

1. An apparatus for public key encryption using a white-box cipher algorithm, the apparatus comprising:
   a key table generator configured to generate at least one key table based on a cipher key;
   a hiding method determinator configured to determine a conversion method for generating at least one hidden-key table depending on a size of the at least one key table;
   a hidden-key table generator configured to generate the at least one hidden-key table by performing conversion of the at least one key table based on the determined conversion method; and
   an encryption algorithm generator configured to generate a white-box implemented encryption algorithm by using the at least one hidden-key table and an inverse operation of the conversion, and provide the generated white-box implemented encryption algorithm as a public key for encryption,
   wherein the encryption algorithm generator is further configured to generate the white-box implemented encryption algorithm by repeatedly combining the at least one hidden-key table and a substitution function including the inverse operation of the conversion based on an Even-Mansour scheme, and
   wherein at least one of the key table generator, the hidden-key table generator and the encryption algorithm generator is implemented using at least one hardware processor.

2. The apparatus of claim 1, further comprising:
   a decryption algorithm generator configured to generate a white-box implemented decryption algorithm by using the at least one key table; and
   a decryptor configured to decrypt data, which is encrypted with the white-box implemented encryption algorithm, with the white-box implemented decryption algorithm.

3. A method for public key encryption using a white-box cipher algorithm, the method comprising:
   generating at least one key table based on a cipher key;
   determining a conversion method for generating at least one hidden-key table depending on a size of the at least one key table;
   generating the at least one hidden-key table by performing conversion of the at least one key table based on the determined conversion method;
   generating a white-box encryption algorithm by using the at least one hidden-key table and an inverse operation of the conversion;
   and providing the white-box encryption algorithm as a public key for encryption,
   wherein the generating the white-box encryption algorithm comprises generating the white-box implemented encryption algorithm by repeatedly combining the at least one hidden-key table and a substitution function including the inverse operation of the conversion based on an Even-Mansour scheme.

4. The method of claim 3, further comprising:
   generating a white-box decryption algorithm by using the at least one key table; and
   decrypting data, which is encrypted with the white-box encryption algorithm, with the white-box decryption algorithm.

5. An apparatus for public key encryption using a white-box cipher algorithm, the apparatus comprising:
   a key table generator configured to generate, based a cipher key, at least one encryption key table and at least one decryption key table;
   a hiding method determinator configured to determine a first method for generating at least one encryption hidden-key table and a second method for generating at least one decryption hidden-key table depending on each of a size of the at least one encryption key table and the at least one decryption key table;
   a first hidden-key table generator configured to generate the at least one encryption hidden-key table by performing conversion of the at least one encryption key table in the determined first method;
   a second hidden-key table generator configured to generate the at least one decryption hidden-key table by performing conversion of the at least one decryption key table in the determined second method different from the first method;
   an encryption algorithm generator configured to generate a white-box implemented encryption algorithm by using the at least one encryption hidden-key table and an inverse operation of the first method;
   a decryption algorithm generator configured to generate a white-box implemented decryption algorithm by using the at least one decryption hidden-key table and an inverse operation of the second method; and
   a key provider configured to provide one algorithm of the white-box implemented encryption algorithm and the white-box implemented decryption algorithm as a public key, and provide another algorithm of the white-box implemented encryption algorithm and the white-box implemented decryption algorithm as a private key,
   wherein the encryption algorithm generator is further configured to generate the white-box implemented encryption algorithm by repeatedly combining the at least one encryption hidden-key table and a substitution function including the inverse operation of the first method based on an Even-Mansour scheme, and wherein at least one of the key table generator, the hidden-key table generator and the encryption algorithm generator is implemented using at least one hardware processor.

6. A method for public key encryption using a white-box cipher algorithm, the method comprising:
generating, based on a cipher key, at least one encryption key table and at least one decryption key table;
determining a first method for generating at least one encryption hidden-key table and a second method for generating at least one decryption hidden-key table depending on each of a size of the at least one encryption key table and the at least one decryption key table;
generating the at least one encryption hidden-key table by performing conversion of the at least one encryption key table in the determined first method;
generating the at least one decryption hidden-key table by performing conversion of the at least one decryption key table in the determined second method different from the first method;
generating a white-box implemented encryption algorithm by using the at least one encryption hidden-key table and an inverse operation of the first method;
generating a white-box implemented decryption algorithm by using the at least one decryption hidden-key table and an inverse operation of the second method; and
providing one algorithm of the white-box implemented encryption algorithm and the white-box implemented decryption algorithm as a public key, and providing another algorithm of the white-box implemented encryption algorithm and the white-box implemented decryption algorithm as a private key,
wherein the generating the white-box encryption algorithm comprises generating the white-box implemented encryption algorithm by repeatedly combining the at least one encryption hidden-key table and a substitution function including the inverse operation of the first method based on an Even-Mansour scheme.

* * * * *